July 1, 1930.  J. A. DORAN  1,769,337
SAFETY CATCH
Filed May 18, 1928   3 Sheets-Sheet 2
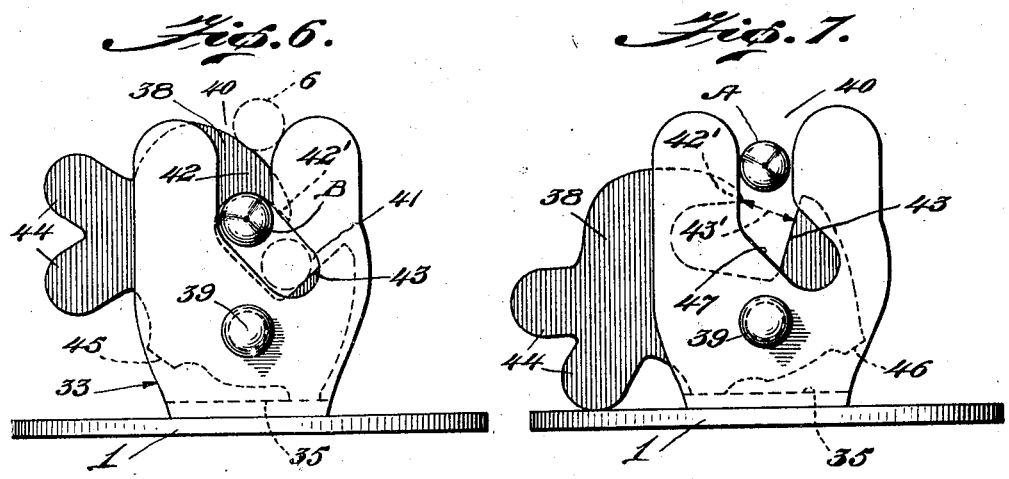
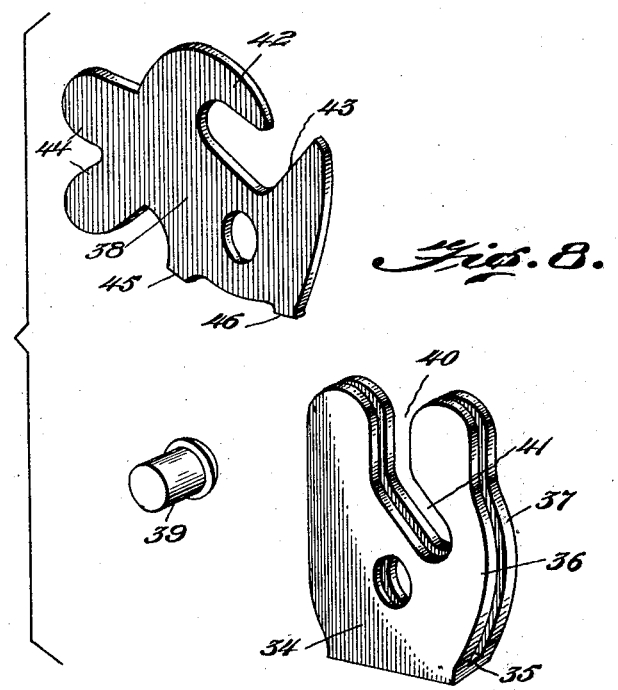

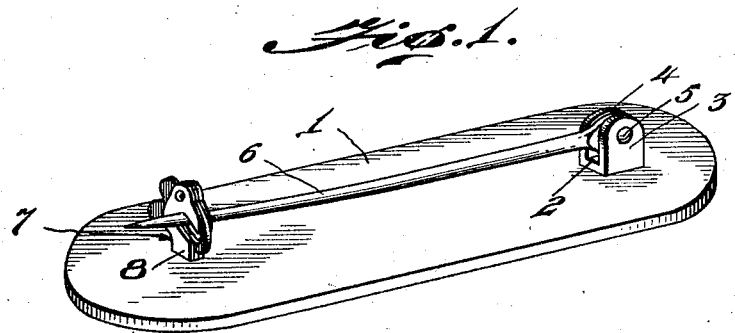
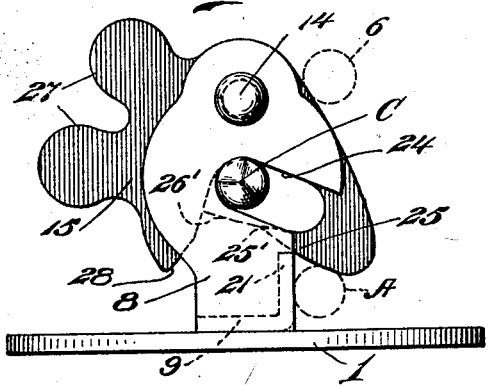
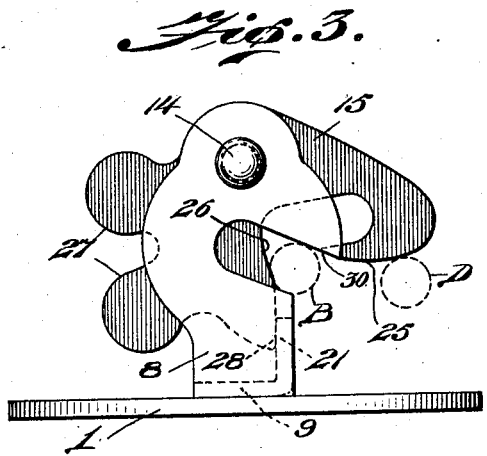
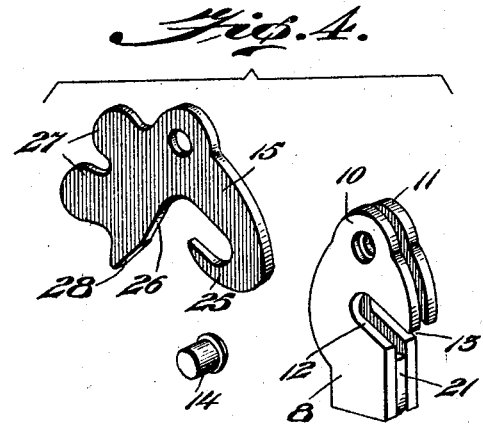
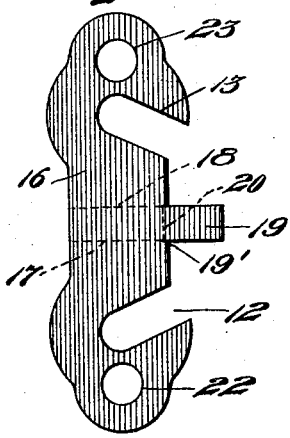

July 1, 1930.  J. A. DORAN  1,769,337
SAFETY CATCH
Filed May 18, 1928  3 Sheets-Sheet 3

Inventor
James A. Doran
By Perley H. Plant
Attorney

Patented July 1, 1930

1,769,337

UNITED STATES PATENT OFFICE

JAMES A. DORAN, OF PROVIDENCE, RHODE ISLAND

SAFETY CATCH

Application filed May 18, 1928. Serial No. 278,792.

This invention relates to an improved safety catch particularly adapted for use in connection with articles of jewelry such as bar pins, brooches, necklaces and the like, but capable of such general uses as require automatic or semi-automatic safety catches or holding devices.

One object of the present invention is to provide a device of this character adapted to furnish a positive locking means for holding the pin tongue of a bar pin or brooch, or the connecting link of a necklace against separation from its keeper until released by manual operation of the catch.

Another object of the invention is to provide a device of this character having the parts so constructed and arranged as to move the locking plate to open position when the pin tongue or connecting member is positioned beneath the curved tip of the locking plate through the influence of spring pressure or other force tending to move the pin tongue to open position, or through the tension normally tending to separate the elements comprising a necklace, whereby the pin tongue or connecting member is normally directed into the locking recess and automatically retained therein by means of an automatic safety catch.

A further object of the invention is to provide means in a device of this character for closing the locking recess by automatic operation of the locking plate upon entry of the pin tongue or connecting member within the recess, thus insuring automatic operation of the safety catch and retention of the pin tongue or connecting member in the locking recess.

A further object of the invention is to provide a device of this character wherein the parts are so proportioned and arranged that the pin tongue or connecting member can escape from the locking recess only when the relative positions of the pin tongue or connecting member and locking plate continue to bear a certain definite and fixed relation to each other throughout extended movement of the locking plate.

Another object of the invention is to provide a simple and efficient device of this character which is capable of being easily and cheaply constructed, and which is so formed that the parts thereof will not readily get out of order through continued use.

Other objects and advantages of the invention relate to various improved details of construction as well as novel arrangements of the operating parts, as will be more fully set forth in the detailed description to follow:—

Figure 9:
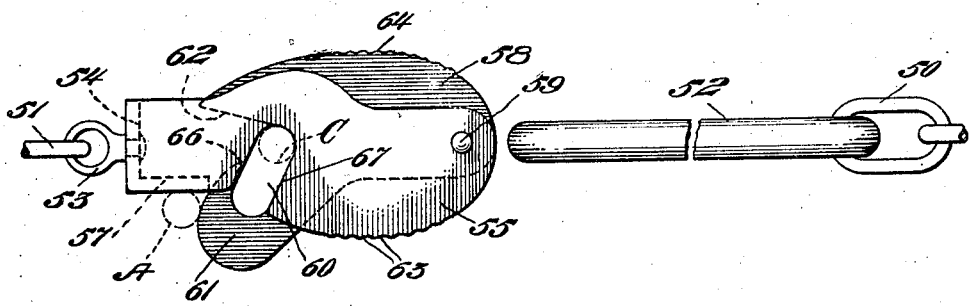
Figure 10:
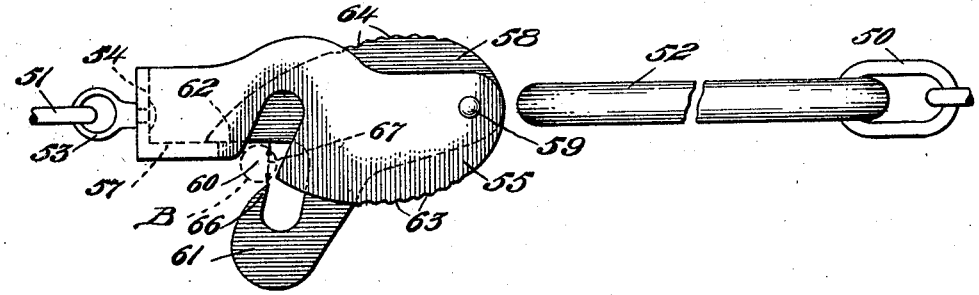
Figure 11:
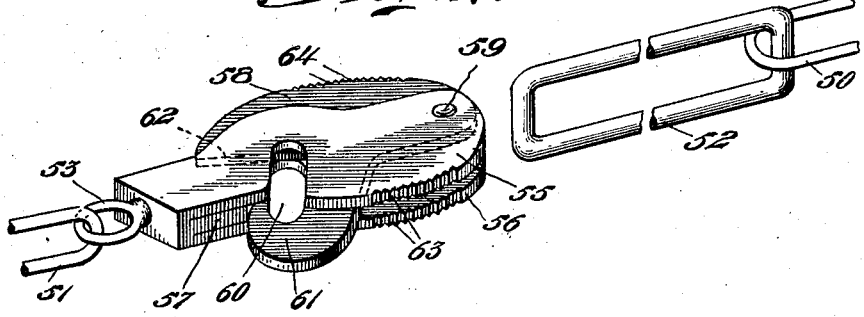

In the accompanying drawings:

Fig. 1 is a perspective view of a bar pin illustrating the position of the pin tongue in its relation to the improved safety catch, Fig. 2 is an enlarged side elevational view of the safety catch showing the locking plate in its closed position, and illustrating various positions of the pin tongue relative to the locking plate, Fig. 3 is an enlarged side elevational view of the safety catch showing the locking plate in its open position, Fig. 4 is an enlarged perspective disassembled view of the parts of the safety catch, Fig. 5 is an enlarged plan view of the blank from which the housing or keeper is formed, Fig. 6 is an enlarged side elevational view of a slightly modified form of safety catch showing the locking plate in its closed position, and illustrating various positions of the pin tongue relative to the locking plate, Fig. 7 is an enlarged side elevational view of the safety catch shown in Fig. 6, with the locking plate in open position to show the normal position of the parts when the pin tongue is about to enter the locking recess, Fig. 8 is an enlarged perspective view of the operating parts comprising the safety catch shown in Figs. 6 and 7, and illustrating those parts in disassembled position, Fig. 9 is an enlarged top plan view of one form of my improved safety catch such as is well adapted for use in connection with necklaces and the like, and showing the position of the parts when the locking plate is closed, Fig. 10 is an enlarged top plan view of the structure shown in Fig. 9 illustrating the position of the parts when the locking plate is open to receive the connecting link, and, Fig. 11 is an enlarged perspective view of the structure shown in Figs. 9 and 10.

In the embodiment of the invention illustrated in Figs. 1 and 5 inclusive, 1 designates a bar pin or brooch of any desired shape having secured thereto a joint 2 provided with oppositely positioned sides 3 and 4 spaced from each other and connected by a pin 5 which serves as a pivotal support for a pin tongue 6 mounted between the sides 3 and 4 of the joint.

The pin tongue and joint, as above described, are of well-known and conventional construction, and any suitable form of pin tongue and pivotal support therefor may be employed as it is found desirable.

The safety catch 7 comprises a keeper 8 having a base 9, secured to the bar pin 1 in any suitable or desired manner, and oppositely positioned spaced side members 10 and 11, provided with registering inclined slots 12 and 13 respectively, the side members being connected by a pivot pin 14 which supports a locking plate 15 between the side members 10 and 11.

The keeper 8 is preferably formed from a blank 16, as shown in Fig. 5, and the opposite ends of the blank forming the side members 10 and 11 of the keeper are bent up at right angles to the base 9, along the dotted lines 17 and 18 respectively. The projecting lug 19 of the blank is preferably sheared into the body at both sides as at 19' and is bent or struck up, as along the line 20, to form the stop 21 of the keeper, the outer face of which is substantially flush with the edges of the side members.

The openings 22 and 23 formed in the blank 16 are so positioned as to be brought into registry with each other, when the ends of the blank are bent up as described, to receive the pivot pin 14. In like manner, the inclined slots 12 and 13 are brought into registry with each other when the ends of the blank 16 are bent up as above described to form a recess adapted to receive the pin tongue.

When the keeper 8 is completed and secured to the back of the bar pin 1, the slots 12 and 13 together form a recess 24 which is inclined relative to the surface of the bar pin and which is open to receive the pin tongue in one position of the locking plate 15.

The locking plate 15, pivotally supported by the pivot pin 14, is provided with a curved end 25 adapted to serve as a closure for the open end of the recess 24 when the locking plate is in its closed position as shown in Fig. 2. The locking plate 15 is also provided with an inclined shoulder 26 adapted to move across a portion of the recess 24 when the locking plate is in its open position, as shown in Fig. 3. Lugs 27 project outwardly from one side of the locking plate whereby the same may be rotated about the pivot pin 14 to move the locking plate into either open or closed position as desired, excessive movement of the locking plate in either direction being prevented by the heel 28 or curved end 25 engaging the stop 21, as shown in Figs. 3 and 2 of the drawings.

The tip 25' of the curved end 25 is so positioned relative to the adjacent portion of the shoulder 26, and the pivot 14 is so arranged with reference to the locking plate that effective clearance for the pin tongue to permit its separation from the recess 24 is always substantially constant and never exceeds the diameter of the pivot pin by more than a few thousandths of an inch, as indicated by the dotted line 26' connecting the tip 25' of the curved end with the adjacent portion of the shoulder 26.

In the operation of that form of the invention shown in Figs. 1 to 5 of the drawings, the pin tongue 6 may be positioned within the recess 24 by pressing the pin tongue down into the position indicated by A in Fig. 2, where it engages beneath the curved end 25 of the locking plate and the spring inherent in the pin tongue or manual pressure exerted by the user will cause it to move outwardly with sufficient force to turn the locking plate about its pivot to a sufficient extent to permit the pin tongue to enter the recess 24. The continued tendency of the pin tongue to move outwardly will cause it to engage the overhanging portion 30 of the keeper, as indicated at B, and thus the pin tongue will be guided into recess 24. As the pin tongue passes into the recess 24 it engages the shoulder 26 of the locking plate and moves the locking plate from the position in Fig. 3 to the position shown in Fig. 2 where the curved end of the locking plate serves as a closure for the open end of the recess and the pin tongue occupies the position indicated at C. Thus it will be seen that the operation of the locking plate is such as to automatically position the pin tongue in the recess and close the locking plate after the pin tongue has been pressed into the position indicated by A beneath the curved end of the locking plate. Moreover, the usual tendency of the pin tongue to move outwardly away from the bar pin body or the force exerted from the pin tongue by the fabric held between the pin tongue and body of the bar pin tends to hold the pin tongue in the position indicated by C and thus retains the locking plate in its closed position, as shown in Fig. 2 of the drawings.

While, normally, there is a tendency for the pin tongue to move outwardly from the bar pin and to occupy the position shown at C in Fig. 2, by reason of the spring inherent in the pin tongue as well as by reason of the fabric body located between the pin tongue and the bar pin when the structure is in use, such tendency may be wholly or partially overcome through wear of the parts or by reason of accidental causes, and when this happens the pin tongue may move out of the position indicated at C in Fig. 2 and occupy positions in the recess 24 more or less removed from its position as shown at C. It will be noted however that the width of the recess 24 is such as to provide only enough clearance for free movement of the pin tongue therein, and the tip 25′ of the curved end 25 is spaced from the shoulder 26 to such an extent only as to permit passage of the pin tongue therebetween, it is necessary, therefore, in order to permit intentional release of the pin tongue from the recess that the movement of the pin tongue outwardly of the recess 40 synchronize, in practically every part of its path of movement, with the pivotal movement of the locking plate 15 about its pivot 14. For example, if the pin tongue 6 should move outwardly from its position shown at C in the recess 24 any appreciable distance without corresponding movement of the locking plate it would pass over the tip 25′ of the curved end 25 and thus lock the locking plate against rotation on its pivot 14 so that the pin tongue would still be securely held in the recess. In fact, the only condition under which the pin tongue may be accidently freed from the recess is by continued movement of the pin tongue in synchronism with corresponding continued movement of the locking plate about its pivot, and the possibilities of these movements taking place simultaneously and in unison, by reason of accidental causes or through manipulation by one unfamiliar with the constructions, is so remote as to almost entirely preclude the accidental separation of the parts or the removal of the pin tongue by a thief.

When it is desired to remove the pin tongue from the recess 24, the user exerts pressure with the finger upon the lugs 27 to rotate the locking plate into the position shown in Fig. 3, and the pin tongue being in the position indicated at C, bearing against the shoulder 26 of the locking plate, is caused to travel through the recess 24 constantly in contact with the shoulder 26, thus affording the requisite clearance only for the movement of the pin tongue from the recess and between the tip 25′ and the shoulder 26 of the locking plate. The parts are so constructed that when the heel 28 engages the stop 21, the curved end 25 of the locking plate will have moved sufficiently to uncover the open end of the recess 24 and form a substantial continuation of the overhanging portion 30 of the keeper whereby the pin tongue may be manually pressed outwardly and over the curved end 25 as indicated at D.

In that form of the invention illustrated in Figs. 6 and 8 of the drawings, the safety catch 33 mounted upon the bar pin 1, comprises a keeper 34, which may be formed from a blank having the sides thereof bent up as in the previously described embodiment of the invention, and comprises a base portion 35 and oppositely positioned side members 36 and 37 spaced from each other to receive therebetween a locking plate 38 pivotally supported by a pivot pin 39 passed through the side members 36 and 37.

The side members 36 and 37 are cut away to form an open ended recess 40 a portion 41 of which is inclined relative to the bar pin 1, and which is of such width as to admit the pin tongue 6 with only sufficient clearance to allow free movement of the pin tongue within the recess.

The locking plate 38 comprises a curved end 42 which is adapted to serve as a closure for the open end of the recess 40 when the locking plate is in closed position, as shown in Fig. 6, and a shoulder 43 adapted to move into the portion 41 of the recess when the locking plate is in its open position, as shown in Fig. 7.

The locking plate is also provided with lugs 44 normally projecting at one side of the keeper for manually moving the locking plate, and stops 45 and 46 adapted to engage the base 35 of the keeper for limiting the movement of the locking plate relative to the keeper in either direction of its movement.

As in the previously described embodiment of the invention the curved end 42 of the locking plate is provided with a tip 42′ which extends towards the shoulder 43 of the locking plate sufficiently to leave a space 43′ therebetween having a width exceeding the diameter of the pin tongue 6 by only a few thousandths of an inch so as to provide only sufficient space for the free passage of the pin tongue into and out of the recess 40 and between the tip 42′ and the shoulder 43 when the parts are in position to permit the entry of the pin tongue into the recess or its passage therefrom.

In the operation of the structure shown in Figs. 6 to 8, the pin tongue 6 is engaged by being pressed directly down into the recess 40 as indicated at A in Fig. 7, and as it enters the recess it engages the inclined edge 47 of the inclined portion 41 whereby it is forced against the shoulder 43 of the locking plate 38 thereby turning the locking plate into its closed position as shown in Fig. 6. The pivot pin 39 is so positioned and the curved end 42 of the locking plate so formed that when the locking plate is in the position shown in Fig. 6 the tip 42′ of the curved end engages over the pin tongue 6 and positively locks the pin tongue against separation from the recess as shown at B, and also holds the locking plate against rotation on the pivot pin 39.

As in the previously described embodiment of the invention, the recess 40 is of such width as to only admit of free movement of the pin tongue to and from the recess, and the tip 42′ of the curved end 42 is spaced from the shoulder 43 only a sufficient distance to admit free movement of the pin tongue therebetween. It follows from the above construction that the pin tongue 6 may move away from the position shown at B and within the recess 40 without permitting accidental or unauthorized release of the pin tongue from the recess, unless the pin tongue is first moved into engagement or substantial engagement with the shoulder 43 and unless further movement of the pin tongue in the recess is accompanied by corresponding and substantially simultaneous movement of the locking plate so that the presence of the pin tongue at or near the position B will not lock the locking plate against rotation, and to permit the space between the tip 42′ and the shoulder 43 to register with the recess 40 when the pin tongue 6 is in such position in the recess as to permit it to move out therefrom freely.

When it is desired to remove the pin tongue from the recess 40, the pin tongue is pressed down against or adjacent to the shoulder 43, and the lugs 44 manually engaged to tilt the locking plate into open position, as seen in Fig. 7. Movement of the locking plate about its pivot causes the pin tongue to travel across the lower portion 41 of the recess and into position where it may freely pass the tip 42′ of the curved end 42 and move out of the recess when the parts assume the position shown in Fig. 7 of the drawings.

As in the form previously described the movement of the pin tongue into the recess when the parts are in the position shown in Fig. 7, permits the pin tongue to pass the tip 43′ and causes the same to then engage the shoulder 43 on the locking plate to automatically move the locking plate into closed position where the locking plate positively holds the pin tongue against separation from the recess.

In that form of the invention shown Figs. 9 to 11, the device has been illustrated in connection with a safety clasp for necklaces or the like wherein 50 and 51 designate links located at opposite ends of a necklace which are connected respectively to a connecting link 52 and a swivel 53. The swivel 53 is passed through the base 54 of a keeper which comprises side members 55 and 56 spaced from each other, and a stop 57 located between the spaced side members adjacent to the base 54. A locking plate 58 is pivotally supported between the side members 55 and 56 by a pivot pin 59 passed through said side members, and the side members are provided with registering slots which together form an open ended recess 60 which is inclined relative to the longitudinal axis of the safety clasp. The locking plate 58 is provided with a curved end 61 adapted to engage the stop 57 and serve as a closure for the open end of the recess 60 when the locking plate is in its closed position as shown in Fig. 9 of the drawings. The locking plate 58 is also provided with a shoulder 62 adapted to move over a portion of the recess 60 and engage this stop 57 when the locking plate is in its open position, as shown in Fig. 10 of the drawings.

As in the forms previously described, the recess 60 is formed of only sufficient width to admit the connecting member 52 with the necessary slight clearance to permit reasonably free movement of the connecting member into and out of the recess. The curved end 61 of the locking plate is provided with a tip 66 which extends to point sufficiently close to the shoulder 62 as to leave a space only sufficient for the passage of the pin tongue therebetween as indicated by the dotted line 67. It follows therefore that while the tension normally exerted upon the connecting member 52 causes the same to occupy the position indicated at C on Fig. 9, no movement of the connecting member 52 from that position in the recess 60 will permit its release from the recess unless such movement is accompanied by movement of the locking plate synchronized to correspond with the movement of the connecting member. For example, any appreciable movement of the connecting member 52 from the position indicated by C in Fig. 9 will cause it to move under the tip 66 and positively lock the locking plate against movement to open the recess and permit the escape of the connecting member, unless the locking plate rotates on its pivot in correspondence with the movement of the connecting member.

In the operation of the structure shown in Figs. 9 to 11 the end of the connecting link 52 is brought into the recess 60 by being slipped back over the curved end 61 of the locking plate into the position indicated by A on Fig. 9 of the drawings. A straight pull upon the necklace chain causes the end of the connecting link 52 to press against the curved end 61 of the locking plate and thus turn the locking plate 58 on its pivot 59 into its open position as shown in Fig. 10 when the connecting link 52 enters the recess 60 and engages the shoulder 62 of the locking plate, as shown at B. Further tension on the necklace links causes the connecting link to slide farther into the recess 60 until it occupies the position indicated by C on Fig. 9, thus turning the locking plate 58 into position to completely close the open end of the recess 60. If, when the locking plate is closed as shown in Fig. 9 of the drawings, with the connecting link 52 in the recess 60, any movement of the chain should throw the link back towards the open end of the recess 60, it will be caught by the curved end 61, which being shaped as a hook holds the locking plate against movement and positively prevents the link from escaping from the recess.

When it is desired to open the safety clasp, the roughened edges 63 and 64 of the side members and locking plate are grasped by the fingers and pressed together to move the locking plate into its open position, as shown in Fig. 10, while the connecting member 52 occupying the position indicated at C on Fig. 9, is caused to travel along the shoulder 62 of the locking plate as the shoulder moves across the recess 60, thereby permitting the connecting member to pass under the tip 66 of the curved end 61 as the locking plate moves outwardly. It will be seen that so long as the connecting member 52 moves in contact or substantial contact with the shoulder 62 and travels across the recess 60 coincident with the movement of the locking plate it will be permitted to pass under the tip 66 and thus be brought into the position indicated by B in Fig. 10, where it can pass out over the curved end 61 of the locking plate, but that it is practically impossible for the connecting member to escape accidently or be removed surreptitiously in view of the necessity for coordination between the movement of the connecting member and locking plate.

From the above it will be seen that I have provided a safety catch or clasp capable of use in connection with a wide variety of jewelry articles and similar structures, in which the locking plate automatically moves into locking position when the pin tongue or connecting member is placed in proper position relative thereto, and is automatically held in locked position by the tendency of the end of the pin to move outwardly from the bar pin or by the tension ordinarily exerted upon the connecting member. The hook construction of the curved end of the locking plate, also, is such as to positively and with certainty prevent the pin tongue or connecting member from escaping from the recess if it should chance to move outwardly into engagement therewith and any such outward movement of the pin tongue or connecting member in the recess serves to positively lock the locking plate against pivotal movement unless such outward movement of the pin tongue or locking plate occurs coincident with a corresponding relative movement of the locking plate.

It will be seen therefore that in each of the various forms of my improved structure the pin tongue or connecting member is positively held against separation from the recess except when its outward movement is caused to synchronize with the movement of the locking plate. While such correspondence in the movement of these parts will be readily effected by one familiar with the manner of operating them, it is such as to make accidental separation of the parts practically impossible and also precludes the separation of these parts being made by any unauthorized person without giving warning to the wearer.

In the form of my invention shown in Figs. 1 to 5 and 9 to 11, the tension or pull exerted by the pin tongue or connecting member acts against the main body portion of the keeper, thus placing no strain whatever on the pivoted locking plate. In the embodiment illustrated in Figs. 6 to 8 of the drawings, the tension of the pin tongue is exerted against the curved end of the locking plate, but the location of the pin 39 is such that the strain exerted thereon is in a substantially straight line with reference to the bar pin and consequently has no tendency to exert undue strain on the moving parts.

In the various forms of my invention the ends of the pivot pins 14, 39 and 59 located exteriorly of the side members are preferably headed over or rounded at each end to securely retain the pivot pin in place and prevent any undesired separation of the side members or undue play of the locking plate.

Moreover, the provision of the shouldered portion on the locking plate engageable by the pin tongue or connecting member as it enters the recess always moves the locking plate into locked position, and the tension normally exerted upon the pin tongue or locking plate tends to hold the locking plate in locked position at all times except when when the mechanism is manually actuated to open the same.

Although, the improved safety catch has been shown and described with particular reference to articles of jewelry, since it is in connection with such structures that I now propose to employ the same, it is to be understood that the invention is capable of use in various other relations, and it is not my intention to in any way limit the use of the same to articles of jewelry, but to cover its use broadly in the appended claims for all of the various purposes to which it may be found applicable.

While I have shown and described several forms which my invention may assume in practice it is to be understood that various other forms and adaptations of the same may be employed without departing from the spirit and scope of my invention as set forth in the appended claims which are to be broadly construed in the light on my disclosure.

What I claim is:—

1. In a device of the character described, a keeper provided with an open-ended recess, a connecting member movable into and out of said recess, and a locking plate mounted for pivotal movement relative to said keeper and provided with a hook portion for preventing accidental movement of said connecting member from said recess, and cooperating means carried by said keeper and locking plate for guiding the connecting member past said hook portion as the connecting member is moved out of said recess.

2. In a device of the character described the combination of relatively movable members provided with cut away portions cooperating to form a closed recess in one position of said members and open-ended recess in another position of said members, a connecting member insertible within or removable from said recess only when the movement of said connecting member into and out of said recess is coordinated with the movement of said movable members relative to each other, and means carried by said relatively movable members for controlling the movement of said connecting member as it moves into and out of said recess.

3. A safety catch of the character described comprising a keeper provided with a recess, a connecting member movable into or out of said recess, and a locking plate pivoted to said keeper and provided with a curved end portion forming a hook which is adapted to serve as a closure for the recess when the locking plate is in closed position and having the outer surface thereof shaped to effect automatic movement of the locking plate to open position upon pressure being exerted thereon by the connecting member.

4. A safety catch of the character described comprising a keeper provided with an outwardly inclined recess formed in one side thereof, and a locking plate pivoted to said keeper and provided with a curved end portion forming a hook which is adapted to serve as a closure for the recess in said keeper in one position of said locking plate.

5. A safety catch for articles of jewelry comprising a keeper having opposed sides spaced from each other and provided with registering slots, a locking plate provided with a bearing shoulder and a hook pivotally secured to said keeper and located between the sides thereof for movement across the path of said slots, and a common stop for limiting the movement of said locking plate in either of its two directions of movement.

6. A safety catch for articles of jewelry comprising a keeper provided with an inclined recess, a connecting member, a locking plate pivotally secured to said keeper and provided with a hook adapted to serve as a closure for the open end of said recess when the locking plate is in closed position and having a curved outer face engageable by the connecting member for automatically moving the locking plate into its open position relative to said recess.

7. A safety catch for articles of jewelry comprising a keeper for a pin tongue provided with a base portion and having spaced sides arranged in substantial parallelism, said keeper being provided with an open-ended recess inclined relative to the base of said keeper, and a locking plate pivotally supported by said keeper and having a curved end portion movable over the open end of the recess to serve as a closure for the same and a shoulder engageable by the pin tongue for moving the locking plate into position to close the recess upon entry of the pin tongue into the recess.

8. In a safety catch for articles of jewelry, the combination of a pin tongue mounted for pivotal movement about a support, a keeper provided with an inclined recess for the reception of the pin tongue, a locking plate pivotally secured to said keeper and provided with a hook adapted to serve as a closure for the open end of the recess when the locking plate is at the limit of its position in one direction, and means whereby the pin tongue will engage the locking plate to move the same into closed position relative to the recess.

9. In a safety catch for articles of jewelry, the combination with a movable connecting member, of a keeper provided with a recess inclined with reference to the direction of movement of said connecting member, and a locking plate pivotally movable with reference to said keeper and having portions adapted to move across opposite ends of the recess when the locking plate is at the extremities of its pivotal movement.

10. In a safety catch for articles of jewelry, the combination with a movable connecting member, of a keeper provided with a recess inclined with reference to the direction of movement of said connecting member, and a locking plate pivotally movable with reference to said keeper and provided with a curved end portion adapted to move over the open end of the recess when at the extremity of its pivotal movement in one direction and serve as a closure therefor.

11. A safety catch of the character described comprising a connecting member, a keeper provided with an open-ended recess adapted to receive a portion of the connecting member, one wall of said recess serving as a hook for holding the connecting member against movement to its open position, and a pivotally mounted locking plate having a portion adapted to serve as a closure for the open-ended recess and a portion serving as a guide for guiding the connecting member into said recess in the open position of the locking plate.

12. A safety catch comprising a keeper provided with an inclined recess formed in one side thereof, a connecting member movable into and out of said recess and engageable by one of the side walls of said recess when in position therein to hold the connecting member against movement to its open position, and a pivoted locking plate provided with means engageable by the connecting member for normally holding the locking plate in closed position.

13. A safety catch comprising a keeper provided with an inclined recess formed in one side thereof, a connecting member movable into and out of said recess, a locking plate pivotally supported by said keeper and having a portion thereof movable across the closed end of said recess and a portion engageable by the connecting member for holding the locking plate in closed position.

In testimony whereof I have affixed my signature.

JAMES A. DORAN.